Oct. 11, 1927.
J. MIKOTTIS
1,645,066
SAWING ATTACHMENT FOR TRACTORS
Filed July 29, 1926
2 Sheets-Sheet 1
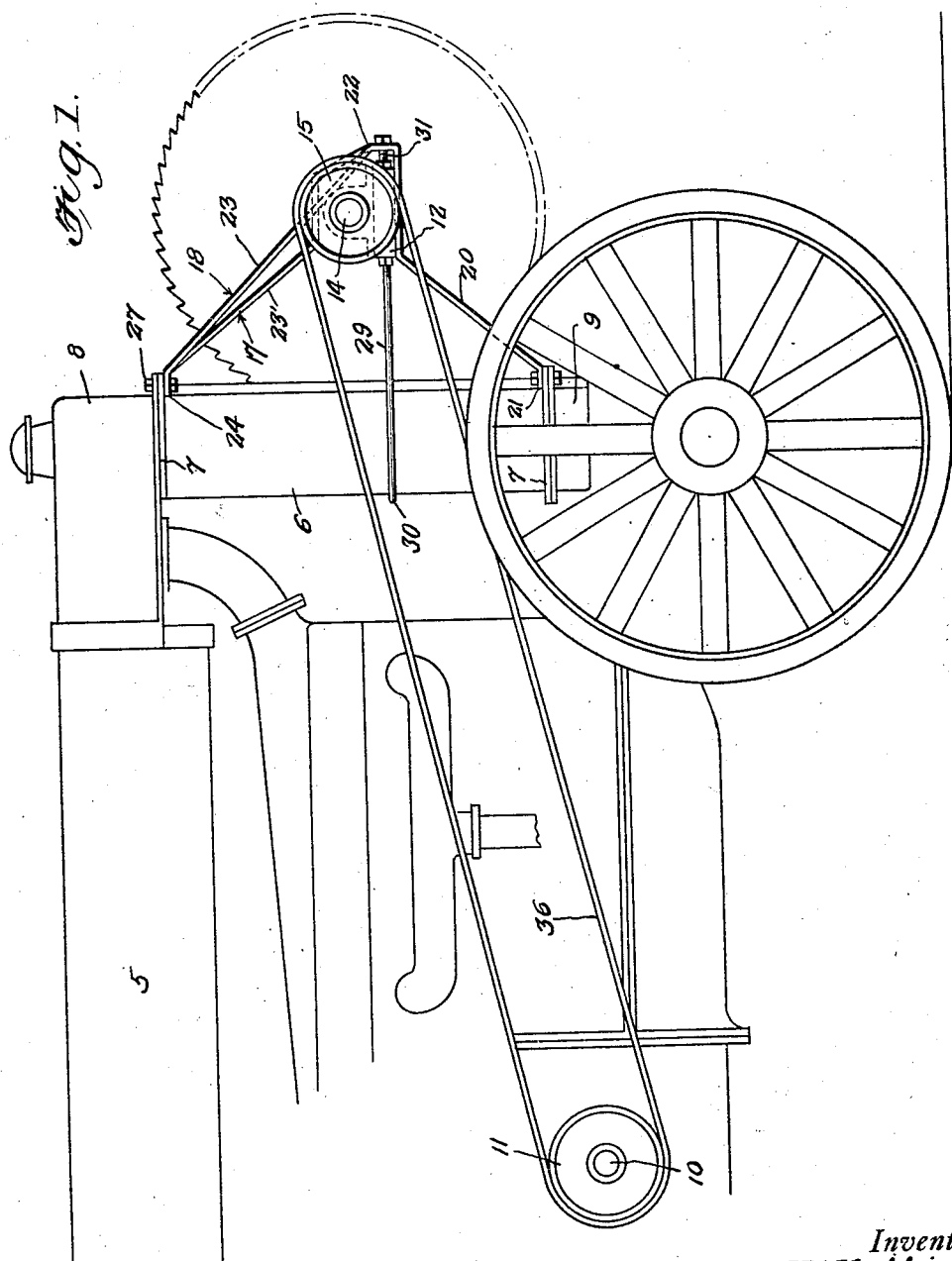
Inventor
Joseph Mikottis,
By Clarence A. O'Brien
Attorney Oct. 11, 1927.                                                               1,645,066
                              J. MIKOTTIS
                     SAWING ATTACHMENT FOR TRACTORS
                        Filed July 29, 1926              2 Sheets-Sheet 2
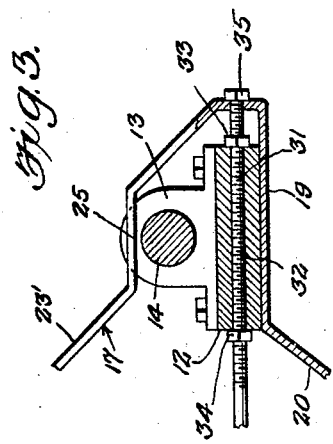
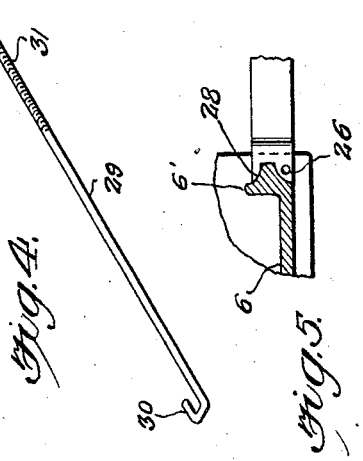
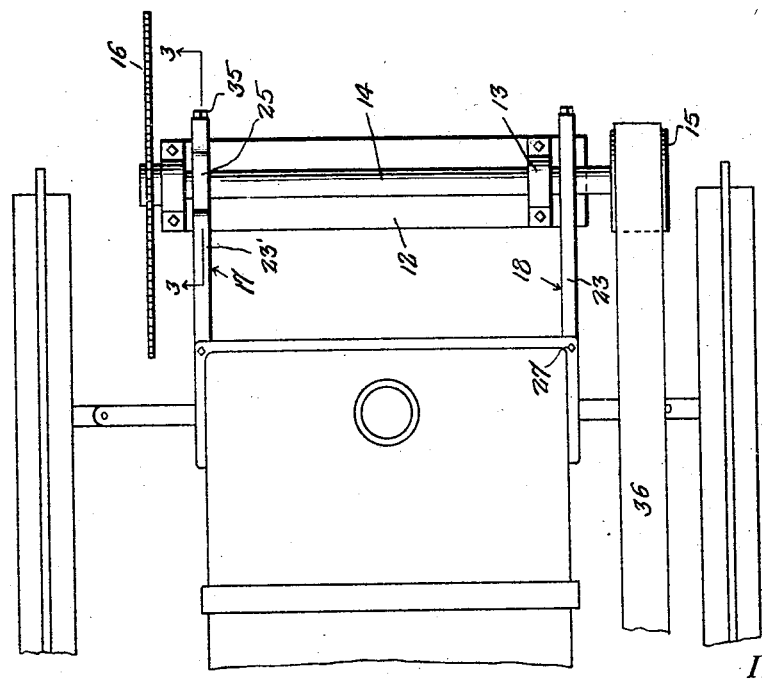
Inventor
Joseph Mikottis,
By Clarence A. O'Brien
Attorney Patented Oct. 11, 1927.

1,645,066

UNITED STATES PATENT OFFICE.

JOSEPH MIKOTTIS, OF GREENWOOD, WISCONSIN.

SAWING ATTACHMENT FOR TRACTORS.

Application filed July 29, 1926. Serial No. 125,310.

This invention relates to wood saws and has for its primary object to provide a circular saw construction that is primarily adapted for disposition upon the forward end of a tractor of the Fordson type so as to facilitate the operation of the saw by the usual power take off pulley of such tractors.

The further object of the invention resides in the provision of a saw of this character that may be readily arranged upon the forward end of the tractor without requiring any unusual skill and that when once applied need not be removed as is usually the case with devices of this general character.

An additional object of the invention is to provide a saw construction for tractors that will effect a weight upon the forward end of the tractor so as to prevent the same from bucking when pulling a heavy load.

Other objects will become apparent as the nature of the invention is better understood the same comprising the novel form, combination, and arrangement of parts hereinafter more fully described, shown in the accompanying drawing and claimed.

In the drawings wherein like reference characters indicate like parts:

Figure 1 is a fragmentary side elevation of a Fordson tractor equipped with a saw constructed in accordance with the present invention.

Figure 2 is a top plan view thereof.

Figure 3 is an enlarged detail section taken substantially upon the line 3—3 of Figure 2 for disclosing more clearly the manner of attachment of the saw shaft supporting board to its tractor attached supporting bracket.

Figure 4 is a perspective of one of the tie rods provided for the adjustable attachment of said supporting boards to the brackets and to the tractor radiator, and Figure 5 is a fragmentary plan view of one end of one of said brackets that is constructed for attachment to the usual upper and lower flanges of the tractor radiator.

Now having particular reference to the drawings, 5 designates generally a tractor of the Fordson type equipped at its forward end with the usual radiator 6 having at its upper and lower edges flanges 7—7 to facilitate the attachment of the same to the usual flanges of the upper and lower headers 8 and 9 respectively of the radiator.

As clearly disclosed in Figure 1, a tractor of this character is provided at its right hand side with a power take off shaft 10 keyed to which is a belt pulley 11.

My invention per se constitutes the provision of a heavy elongated board 12 provided adjacent its opposite ends with vertically extending bearing plates 13 through which are registering openings for receiving a horizontal saw shaft 14 upon one end of which is a belt pulley 15, while upon the opposite end of which is a circular saw 16.

The saw shaft supporting board 12 is supported in horizontal position at the forward end of the tractor and transversely therewith by reason of a pair of brackets 17 and 18. These brackets are formed of strap iron or other suitable metal and are so constructed as to provide forwardly extending horizontal portions 19 upon which the shaft supporting board 12 rests at its opposite ends. From the inner ends of the horizontal portions 19 of said brackets the same are inclined downwardly as at 20 which inclined portions are so bent at their lower ends as to provide lugs 21 for engagement upon the upper sides of the flange 7 at the lower end of the radiator 6 as clearly disclosed in Figure 1.

At the forward end of the horizontal portion 19 of the right hand bracket 18, the same is bent slightly upwardly as at 22 and then rearwardly in an inclined manner as at 23, the extreme end thereof being also bent to provide a lug 24 for engagement beneath the upper flange 7 of said radiator.

The bracket 17 adjacent the saw 16 is of substantially the same formation as the bracket 18, the difference being however that the rearwardly inclined portion 23' is so bent as to extend horizontally over the saw shaft 14 as at 25 so as not to interfere with the cutting of large logs or the like.

The lugs upon the ends of the brackets that are arranged in engagement with the flanges 7—7 of the radiator are formed at one side with an opening 26 so as to permit of the attachment of the same to the flanges by the usual bolt and nut connections 27 between the flanges of the radiator and the previously mentioned flanges of the upper and lower headers 8 and 9, respectively. Furthermore, the inner ends of these lugs are notched as at 28 so as to receive the usual vertical flanges at the forward edges of the radiator side members for thus preventing the pivotal movement of the brackets upon the radiator, one of said flanges being disclosed in Figure 5 and designated by the reference character 6'. This interlocking connection between the ends of the brackets and the radiator will prevent the swinging of the brackets upon the radiator.

The invention further constitutes the provision of a pair of relatively elongated tie rods 29 that are hooked at their inners ends as at 30 for engagement over the inner edges of the radiator side members which as is well known are of sheet metal, the forward ends of the tie rods being screw threaded as at 31. The screw threaded ends of these tie rods are arranged through unthreaded bores 32 adjacent opposite ends of the saw shaft supporting board 12, the extreme forward ends of these rods extending through unthreaded openings in the vertical portions of the brackets 17 and 18 that are directly in front of the board 12 as disclosed in Figure 3. Threaded upon the threaded ends of the tie rods at opposite sides of the board 12 are nuts 33 and 34 serving to securely fasten the board to the tie rods. Threaded upon the ends of the rods that project through the brackets are other nuts 35 and obviously by turning inwardly upon said nuts 35, the hook ends of the tie rods will be firmly engaged with the inner side edges of the radiator side members.

Trained over the power take off shaft pulley 11 of the tractor and the pulley 15 upon the adjacent end of the saw shaft is an endless belt 36 and obviously when said power take off shaft is actuated, a rotation will be imparted to the shaft 14 so as to actuate the circular saw 16.

When it is desired to take up slack in the belt 36, the nuts 33 and 34 upon the tie rods may be loosened and the board 12 slid forwardly and maintained in proper position upon the horizontal portions of the brackets by tightening the nuts against the opposite sides thereof.

It will thus be seen that I have provided a highly novel, simple, and efficient form of saw for tractors that is well adapted for all the purposes heretofore designated and even though I have herein shown and described the invention as consisting of certain detail structural elements it is nevertheless to be understood that some changes may be made without affecting the spirit and scope of the appended claim.

Having thus described the invention, what I claim as new and desire to secure by Letters Patent is:—

In a sawing machine for tractors, a shaft supporting board, a shaft journaled longitudinally upon the board and having a pulley and circular saw, a pair of supporting brackets upon which the board rests, said brackets being constructed for rigid attachment to the front end of the tractor, a driving connection between the pulley of the shaft and the pulley of the tractor power shaft, a pair of relatively elongated tie rods having their ends hooked for engagement over the inner edges of the radiator side members of the tractor and their other ends threaded, said board being provided with openings through which the threaded ends project, said brackets being provided with openings through which the threaded ends project, nuts on the extremities of the threaded ends, a pair of nuts on each of the tie rods, one to each side of the board whereby the board may be adjusted on the brackets to tighten or loosen the belt.

In testimony whereof I affix my signature.

JOSEPH MIKOTTIS.